(12) United States Patent
McGraw et al.

(10) Patent No.: US 7,630,530 B2
(45) Date of Patent: Dec. 8, 2009

(54) SYSTEM AND METHOD FOR FAST TENSOR FIELD SEGMENTATION

(75) Inventors: Tim McGraw, Morgantown, WV (US); Zhizhou Wang, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 731 days.

(21) Appl. No.: 11/327,956

(22) Filed: Jan. 9, 2006

(65) Prior Publication Data

US 2006/0158447 A1  Jul. 20, 2006

Related U.S. Application Data

(60) Provisional application No. 60/644,144, filed on Jan. 14, 2005.

(51) Int. Cl.
*G06K 9/00* (2006.01)
(52) U.S. Cl. ...................................... 382/128
(58) Field of Classification Search ................. 382/128; 600/407; 324/307; 345/419; 702/183
See application file for complete search history.

(56) References Cited

OTHER PUBLICATIONS

Zhizhou Wang, et al., "An Affine Invariant Tensor Dissimilarity Measure And ITS Applications To Tensor-valued Image Segmentation," *Proceedings of the 2004 IEEE Computer Society Conference on Computer Vision and Pattern Recognition*, (CVPR 2004).

Christophe Lenglet, et al., "Segmentation of 3D Probability Density Fields By Surface Evolution Application To Diffusion MRI," *MICCAI*, LNCS 3216, 2004, pp. 18-25.

Bing Song, "Topics In Variational PDE Image Segmentation, Inpainting And Denoising," *A dissertation Submitted in partial satisfaction of the requirements for the degree Doctor of Philosophy in Mathematics*, 2003.

*Primary Examiner*—Brian P Werner
*Assistant Examiner*—Claire Wang

(57) ABSTRACT

Segmenting a digitized image includes providing a diffusion tensor field image, partitioning the image into 2 regions, each point being assigned to one of the regions, associating a level-set function with each region, the level-set function having a negative value in one region and a positive value in the other region, calculating a mean value of the diffusion tensor field over each of 2 regions, initializing an energy defined as a functional of level-set functions and diffusion tensor field, changing the region membership of each point in the image if the energy functional value decreases as a result of region membership change and updating said mean value of said diffusion tensor field over each of 2 regions, and obtaining a segmentation of the image when the magnitude of the change of the energy function value resulting from changing the region membership of a point is less then a predetermined threshold.

27 Claims, 8 Drawing Sheets

SYSTEM AND METHOD FOR FAST TENSOR FIELD SEGMENTATION

CROSS REFERENCE TO RELATED UNITED STATES APPLICATIONS

This application claims priority from "Fast Tensor Field Segmentation Algorithm", U.S. Provisional Application No. 60/644,144 of McGraw and Wang, filed Jan. 14, 2005, the contents of which are incorporated herein by reference.

TECHNICAL FIELD

This invention is directed to the segmentation of objects in digital medical images.

DISCUSSION OF THE RELATED ART

Variational and PDE methods have been widely used in image processing in the past few years. Image segmentation is an issue in early vision and has been extensively studied through these techniques. The basic idea is to represent a 2D image as a $R^2$ function (or $R^3$ for a 3D image) that satisfies a time dependent PDE that characterizes the problem. The solution of the differential equation gives the processed image at the appropriate scale. The PDE can be derived by minimizing an energy functional, which can be formulated as:

$$\text{Arg}\{\min_u F(u)\},$$

where F is a given energy computed over the image u. Let F'(u) denote the Euler-Lagrange derivative. The necessary condition for u to be a minimizer of F is that F'(u)=0, where the (local) minima may be computed via the steady state solution of the equation $$u_t = -F'(u),$$

where t is an artificial time-marching parameter. The most conventional example is the Dirichlet integral:

$$\min_u F(u) = \int_\Omega |\nabla u|^2 \, dx\, dy + \frac{\lambda}{2} \int (u - u_0)^2 dx\, dy,$$

which is associated with equation $$u_t = \Delta u - \lambda(u - u_0).$$

The use of variational and PDE methods in image analysis leads to modeling images in a continuous domain. This simplifies the formalism, which becomes grid independent and isotropic. Conversely, when the image is represented as a continuous signal, PDEs can be seen as the iteration of local filters with an infinitesimal neighborhood. This interpretation of PDE's allows one to unify and classify a number of the known iterated filters, as well as to derive new ones. Many of the PDEs used in image processing and computer vision are based on moving curves and surfaces with curvature-based velocities. In this area, level set methods have proven to be useful. The basic idea is to represent the curves or surfaces as the zero level set of a higher dimensional hypersurface. This technique not only provides accurate numerical implementations but can also handle topological change easily.

Many fields in science and engineering use tensors to describe physical quantities e.g., in solid mechanics, stress and strain are commonly characterized by tensors, in fluid mechanics, anisotropic diffusion is characterized by a tensor, in image processing, tensors have been used for describing local structure in images. More recently, in medical imaging, water diffusion in tissues has been depicted by a diffusion tensor characterizing the anisotropy within the tissue. In this context, processing the data may involve restoration from noisy data, segmentation, visualization and possibly even tensor valued image registration. One factor in tensor field analysis is a proper choice of a tensor distance that measures the similarity or dissimilarity between tensors and is particularly important in the aforementioned tasks.

In general, any kind of matrix norm can be used to induce a tensor distance. One such example is the tensor Euclidean distance obtained by using the Frobenius norm. Due to its simplicity, tensor Euclidean distance has been used extensively in tensor field restoration. As compared to other similarity measures for matching diffusion tensor images, the Euclidean difference measure yields the best results. Though not many sophisticated tensor distances have been proposed in tensor field analysis, there are quite a few in the context of machine learning. One interesting tensor distance measure uses information geometry in the space of positive definite matrices to derive a Kullback-Leibler divergence for two matrices and then uses it in to approximate an incomplete kernel.

Diffusion tensor magnetic resonance imaging is a relatively new imaging modality that is able to quantify the anisotropic diffusion of water molecules in highly structured biological tissues. Diffusion refers to the movement of molecules as a result of random thermal agitation. In the context of diffusion tensor magnetic resonance imaging (DT-MRI), it refers specifically to the random translational motion of water molecules in the part of the anatomy being imaged with MR. In three dimensions, water diffusivity can be described by a 3×3 symmetric positive definite matrix D, known as a diffusion tensor, which is related to the geometry and organization of the microscopic environment. The probability density function of the molecular motion about $r \in R^3$ can be modeled by a Gaussian function whose covariance matrix is given by the diffusion tensor D. Diffusion Tensor Imaging (DTI) then produces a volumetric image containing, at each voxel, a 3×3 symmetric positive definite tensor. The estimation of these tensors requires the acquisition of diffusion weighted images in different sampling directions.

Diffusion tensor MRI is particularly relevant to a wide range of clinical pathologies investigations, such as acute brain ischemia detection, stroke, Alzheimer's disease, schizophrenia, etc. It is also useful in order to identify the neural connectivity of the human brain. As of today, diffusion MRI is the only non-invasive method that allows one to distinguish the various anatomical structures of the cerebral white matter such as the corpus callosum, the arcuate fasciculus or the corona radiata. These are examples of commisural, associative and projective neural pathways, the three major types of fiber bundles, respectively connecting the two hemispheres, regions of a given hemisphere or the cerebral cortex with subcortical areas. In the past, many techniques have been proposed to classify gray matter, white matter and cephalospinal fluid from T1-weighted MR images, but few techniques address segmentation of the internal structures of white matter.

SUMMARY OF THE INVENTION

Exemplary embodiments of the invention as described herein generally include methods and systems for segmenting a tensor field such as that obtained from diffusion tensor MRI.

According to an embodiment of the invention, each voxel in the image is assigned to a class based on the statistics of each region. A segmentation model according to an embodiment of the invention uses a symmetrized Kullback-Liebler divergence to define a tensor distance along with a variance model for each region. A segmentation model according to an embodiment of the invention also includes an additional energy term for each region to penalize the distance from the mean fractional anisotropy in each region where the segmented fractional anisotropy fields are modeled by Gaussian distributions. According to an embodiment of the invention, a region based active contour model involves the definition of a new tensor discriminant based on information theory, a new technique for the computation of the mean tensor of a tensor field in closed form that facilitates the efficient segmentation of the tensor field, and an extension of the region-based active contour model to handle matrix-valued images. According to an embodiment of the invention, a technique for the segmentation of an arbitrary probability density function (pdf) fields examines the statistics of the distribution of the Kullback-Leibler distances between these pdfs to perform direct segmentation of internal structures of white matter. According to an embodiment of the invention, a fast levelset technique is adapted to solve the region based active contour model.

According to an aspect of the invention, there is provided a method for segmenting a digitized medical image, including providing a digitized image of an anatomical region, said image comprising a diffusion tensor field corresponding to a domain of points on an 3-dimensional grid, partitioning said image into 2 regions, wherein each point is initially assigned to one of said regions, associating a level-set function with each region, wherein said level-set function has a negative value in one region and a positive value in the other region, calculating a mean value of said diffusion tensor field over each of said 2 regions, initializing an energy defined as a functional of said level-set functions and said diffusion tensor field, changing the region membership of each point in said image if the energy functional value decreases as a result of said region membership change and updating said mean value of said diffusion tensor field over each of said 2 regions, and obtaining a segmentation of said image when the magnitude of the change of said energy function value resulting from changing the region membership of a point is less then a predetermined threshold.

According to a further aspect of the invention, the energy functional includes the terms $$(1-\beta)\int_\Omega (\log p_{d,1}(d^2(T(x),T_1))H_\epsilon(\phi)+\log p_{d,2}(d^2(T(x),T_2))(1-H_\epsilon(\phi)))dx$$

wherein $\phi:\Omega \to R^3$ denotes the level set function defined on the image domain $\Omega$ whose zero isosurface coincides with a curve enclosing one of said 2 regions, $T_1$ and $T_2$ are the mean values of the tensor field in each of the two regions, $H_\epsilon(\phi)$ is the regularized version of the Heaviside function of the level set function, $p_{d,1}$ and $p_{d,2}$ are probability distribution functions of the tensor distance in each of the two regions, $\beta$ is a weighting parameter, and $d^2(.,.)$ is a tensor distance.

According to a further aspect of the invention, the tensor distance between tensors $T_1$ and $T_2$ is defined by $$d(T_1, T_2) = \frac{1}{2}\sqrt{tr(T_1^{-1}T_2 + T_2^{-1}T_1) - 2n}$$

wherein $tr(\cdot)$ is the matrix trace operator, and n is the size of the square matrices $T_1$ and $T_2$.

According to a further aspect of the invention, the mean value $\overline{M}$ of a diffusion tensor field T(x) in a region R is defined by $$\overline{M}=\sqrt{B^{-1}}[\sqrt{\sqrt{B}A\sqrt{B}}]\sqrt{B^{-1}},$$

wherein $A=\int_R T(x)dx$, and $B=\int_R T^{-1}(x)dx$, and R is the region of integration.

According to a further aspect of the invention, the level-set function has a value of −1 in one region and a value of +1 in the other region.

According to a further aspect of the invention, the probability distribution of the distance from said diffusion tensor field to a mean value of said field is defined as $$p_{d,i} = \frac{1}{\sqrt{2\pi\sigma_{i,d}^2}}\exp\left(\frac{-d^2(T(x), T_i)}{2\sigma_{i,d}^2}\right)$$

where $T_i$ is the mean value of said tensor field in one of said 2 regions, T(x) is said tensor field, $\sigma_{i,d}$ is the variance of said distribution in one of said 2 regions.

According to a further aspect of the invention, the method comprises calculating a fractional anisotropy defined by $$A(T(x)) = \frac{\sqrt{(\lambda_1 - \lambda_2)^2 + (\lambda_2 - \lambda_3)^2 + (\lambda_1 - \lambda_3)^2}}{\sqrt{2}\sqrt{\lambda_1^2 + \lambda_2^2 + \lambda_3^2}},$$

wherein the $\lambda_1, \lambda_2, \lambda_3$ are eigenvalues of the diffusion tensor field, and calculating a mean and variance of said fractional anisotropy over each of said 2 regions.

According to a further aspect of the invention, the method comprises updating the mean value and variance of said fractional anisotropy of the diffusion tensor in each of said 2 regions if the energy functional value decreases as a result of said region membership change.

According to a further aspect of the invention, the energy function further includes terms $$-\beta\int_\Omega (\log p_{\alpha,1}(A(T(x)))H_\epsilon(\phi)+\log p_{\alpha,2}(A(T(x)))(1-H_\epsilon(\phi)))dx,$$

wherein $\phi:\Omega \to R^3$ denotes the level set function defined on the image domain $\Omega$ whose zero isosurface coincides with a curve enclosing one of said 2 regions, $H_\epsilon(\phi)$ is the regularized version of the Heaviside function of the level set function, $p_{\alpha,1}$ and $p_{\alpha,2}$ are probability distribution functions of the fractional anisotropy in each of the two regions, and $\beta$ is a weighting parameter.

According to a further aspect of the invention, the probability distribution function of said fractional anisotropy is defined as $$p_{\alpha,i} = \frac{1}{\sqrt{2\pi\sigma_{i,A}^2}}\exp\left(\frac{|A(T) - \overline{A}|^2}{2\sigma_{i,A}^2}\right),$$

wherein $\overline{A}$ is the mean value of A(T) over the region i, and $\sigma_{i,A}$ is the variance of $p_{\alpha,i}$ over the region i.

According to a further aspect of the invention, the method comprises calculating variances of the distance of said diffusion tensor to the mean value over each of said two regions, and updating said variances when the energy functional value decreases as a result of said region membership change.

According to a further aspect of the invention, a change in energy $\Delta E_{ij}$ from changing the membership of a point from region i to region j includes $$\Delta E_{ij,d} = (1-\beta)\left(\frac{d^2(T(x),T_j)}{2\sigma_{j,d}^2}\frac{n_j}{n_j+1} - \frac{d^2(T(x),T_i)}{2\sigma_{i,d}^2}\frac{n_i}{n_i-1}\right).$$

wherein the value of the point being changed is $T(x)$, $T_i$ and $T_j$ are the mean values of the tensor field in each region, respectively, $\sigma_{i,d}$ and $\sigma_{j,d}$ are the variances of $p_{d,i}$, $p_{d,j}$ over the regions i and j, respectively, and $n_i$ and $n_j$ are the respective number of points for each region.

According to a further aspect of the invention, a change in energy $\Delta E_{ij}$ from changing the membership of a point from region i to region j includes $$\Delta E_{ij,A} = \beta\left(\frac{|A(T(x))-\overline{A}_j|^2}{2\sigma_{j,A}^2}\frac{n_j}{n_j+1} - \frac{|A(T(x))-\overline{A}_i|^2}{2\sigma_{i,A}^2}\frac{n_i}{n_i-1}\right)$$

wherein $\overline{A}_i$ and $\overline{A}_j$ are the mean values of $A(T)$ over the regions i and j, respectively, $\sigma_{i,A}$ and $\sigma_{j,A}$ are the variances of $p_{a,i}$, $p_{a,j}$, over the regions i and j, respectively, and $n_i$ and $n_j$ are the respective number of points for each region.

According to another aspect of the invention, there is provided a program storage device readable by a computer, tangibly embodying a program of instructions executable by the computer to perform the method steps for segmenting a digitized medical image,

DETAILED DESCRIPTION OF THE PREFERRED EMBODIMENTS

Figure 1:
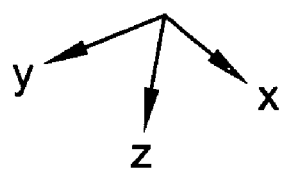
FIGS. 1 and 2 depict an exemplary segmentation of the Corpus Callosum, with and without an FA slice, respectively, according to an embodiment of the invention.

Exemplary embodiments of the invention as described herein generally include systems and methods for segmenting a tensor field such as that obtained from diffusion tensor MRI. A tensor field segmentation method according to an embodiment of the invention incorporates a new discriminant for tensors into an active contour model without edges. The discriminant employed according to an embodiment of the invention is based on information theory, which follows from the physical phenomena of diffusion, is affine invariant and allows for the computation of the mean of the tensor field in closed form. A model according to an embodiment of the invention is implemented in a level set framework to take advantage of the easy ability of this framework to change topologies when desired. A technique for the segmentation of probability density fields according to an embodiment of the invention can extract anatomical structures in anisotropic biological tissues such as the brain white matter.

In the context of DT-MRI, diffusion of water molecules may be characterized by a 2-tensor T which is positive definite. This T is related to the displacement r of water molecules at each lattice point in the image at time t via $$p(r|t,T) = \frac{1}{\sqrt{(2\pi)^n|2tT|}}\exp\left(\frac{-r^T T^{-1} r}{4t}\right)$$

where n is the dimension of the tensor. Thus it is natural to use the distance measure between Gaussian distributions to induce a distance between these tensors. The most frequently used information theoretic distance measure is the Kullback-Leibler (KL) divergence defined as:

$$KL(p\|q) = \int p(x)\log\frac{p(x)}{q(x)}dx$$

for two given densities $p(x)$ and $q(x)$. The KL divergence is not symmetric and a popular way to symmetrize it is given by:

$$J(p,q) = \frac{1}{2}(KL(p\|q) + KL(q\|p)),$$

which is called the J-divergence. According to an embodiment of the invention, a definition of tensor distance for symmetric positive definite (SPD) tensors is the square root of the J-divergence:

$$d(T_1,T_2) = \sqrt{J(p(r|t,T_1),p(r|t,T_2))}.$$

It is known that twice the KL divergence and thus twice the J-divergence is the square distance of two infinitesimally nearby points on a Riemannian manifold of parameterized distributions. Thus, taking the square root of the above definition is justified. Furthermore, this definition has a very simple form given by:

$$d(T_1,T_2) = \frac{1}{2}\sqrt{tr(T_1^{-1}T_2 + T_2^{-1}T_1) - 2n}$$

where $tr(\cdot)$ is the matrix trace operator, and n is the size of the square matrices $T_1$ and $T_2$.

When a coordinate system undergoes an affine transformation, the tensor field will also be transformed. If the coordinate system undergoes an affine transform $y=Ax+b$, then the displacement of the water molecules will be transformed as $\hat{r}=Ar$. Since r has a Gaussian distribution with covariance matrix $2tT$, the transformed displacement $\hat{r}$ has a covariance matrix of $2tATA^T$. Thus, the transformed tensor field will be:

$$\hat{T}(y) = AT(x)A^T, \quad y=Ax+b.$$

The above definition of tensor distance is invariant to such transformations:

$$d(T_1,T_2)=d(AT_1A^T, AT_2A^T).$$

The mean value M(T,R) of a tensor field T over a region R is defined as:

$$\overline{M}(T, R) = \min_{M \in SPD(n)} \int_R d^2[M, T(x)]\,dx,$$

where SPD(n) denotes the set of symmetric positive definite matrices of size n. It can be shown that this mean value can be computed according to the formula $$\overline{M} = \sqrt{B^{-1}}[\sqrt{\sqrt{B}A\sqrt{B}}]\sqrt{B^{-1}},$$

where $A=\int_R T(x)dx$, and $B=\int_R T^{-1}(x)dx$. Since A and B are both SPD matrices, M is also an SPD matrix. The mean value of a tensor field over a region is used in the region-based contour model used in a segmentation according to an embodiment of the invention.

According to an embodiment of the invention, a model for piecewise constant tensor field segmentation in $R^2$ is obtained by minimizing the following energy integral:

$$E(C,T_1,T_2)=\int_\Omega d^2(T(x),T_1)dx+\int_{\Omega^c} d^2(T(x),T_2)dx+\alpha|C|. \quad (1)$$

Here, the curve C is the boundary of the desired unknown segmentation, $\Omega$ is the region enclosed by C and $\Omega^C$ is the region outside C, $T_1$ and $T_2$ are the mean values of the tensor fields in the regions $\Omega$ and $\Omega^C$ respectively, |C| is the arclength of the curve C, $\alpha$ is a regularization parameter, and d(.,.) is the tensor distance as defined above.

An active contour model according to an embodiment of the invention above can segment tensor fields with two piecewise constant regions, where each region type can have disconnected parts, and incorporates the above-defined tensor distance. The Euler-Lagrange equation for the above variational principle is given by:

$$(\alpha k+d^2(T,T_1)-d^2(T,T_2))N=0,$$

where $T_1=M(T,\Omega)$, $T_2=M(T,\Omega^C)$, k is the curvature of the curve C at location x, and N is the outward normal to the curve C. In a two phase implementation, the curve evolution of the Euler-Lagrange is governed by:

$$\frac{\partial C}{\partial t} = -(\alpha k + d^2(T, T_1(t)) - d^2(T, T_2(t)))N,$$

which can be easily implemented in a level set framework. The corresponding level set formulation is given by:

$$\frac{\partial \phi}{\partial t} = \left[\alpha\nabla \cdot \frac{\nabla\phi}{|\nabla\phi|} + d^2(T, T_1) - d^2(T, T_2)\right]|\nabla\phi|.$$

Assuming a partition of the data $\Omega$, one seeks an optimal separating surface $\Gamma$ between a segment $\Omega_1$ and the rest of the volume $\Omega_2$. The most representative mean of tensor fields that minimizes the tensor distance can be denoted by $T_1$ and $T_2$. Furthermore, it is possible to model the distribution of the tensor distances to $T_1$ and $T_2$ in their respective domains by suitable densities $p_{d,1}$, $p_{d,2}$. It can be assumed that $p_{d,1}$ and $p_{d,2}$ are Gaussians of zero mean and variances $\sigma_{1,d}^2, \sigma_{2,d}^2$. The mean distance to $T_1$ and $T_2$ should be as small as possible, while retaining a degree of freedom by considering the variances of those distributions. The following energy can be defined in order to maximize the likelihood of these densities on their associated domain:

$$E(\Omega_i, \sigma_{i,d}^2, T_i) = \sum_{i=1}^{2}\int_{\Omega_i} -\log p_{d,i}(d^2(T(x), T_i))\,dx,$$

where $$p_{d,i} = \frac{1}{\sqrt{2\pi\sigma_{i,d}^2}}\exp\left(\frac{-d^2(T, T_i)}{2\sigma_{i,d}^2}\right).$$

The level set distance function whose zero isosurface coincides with $\Gamma$ is denoted by $\phi:\Omega\to R^3$. One can define an energy functional incorporating the variance and with a regularity constraint on $\Gamma$, using $H_\epsilon(z)$, the regularized version of the Heaviside function, as follows:

$$\int_\Omega -\log p_{d,1}(d^2(T(x),T_1))H_\epsilon(\phi) - \log p_{d,2}(d^2(T(x),T_2))(1-H_\epsilon(\phi))+\alpha|\nabla H_\epsilon(\phi)|dx, \quad (2)$$

which is equivalent to $$-\int_\Omega \log p_{d,1}(d^2(T(x), T_1))\,dx - \int_{\Omega_c} \log p_{d,2}(d^2(T(x), T_2))\,dx + \alpha|C| =$$

$$\int_\Omega \left(\frac{d^2(T(x), T_1)}{2\sigma_{1,d}^2} + \log\sqrt{2\pi\sigma_{1,d}^2}\right)dx +$$

$$\int_{\Omega_c}\left(\frac{d^2(T(x), T_2)}{2\sigma_{2,d}^2} + \log\sqrt{2\pi\sigma_{2,d}^2}\right)dx + \alpha|C|.$$

The derivation of the Euler-Lagrange equations for this class of energy yields the following evolution for $\phi$:

$$\frac{\partial \phi}{\partial t} = \delta_\epsilon(\phi(x))\left[\alpha\nabla\cdot\frac{\nabla\phi}{|\nabla\phi|} + \frac{1}{2}\log\frac{p_{d,2}}{p_{d,1}}\right]\forall\, x\in\Omega,$$

where $\delta_\epsilon(\phi(x))$ is the regularized version of the Dirac function.

When considering the region terms, the initialization is important and in many cases, several seeding points have to be set manually to avoid having the surface evolving to and remaining in a local minima. This can be overcome by using a fractional anisotropy measure:

$$A(T(x)) = \frac{\sqrt{(\lambda_1-\lambda_2)^2 + (\lambda_2-\lambda_3)^2 + (\lambda_1-\lambda_3)^2}}{\sqrt{2}\sqrt{\lambda_1^2+\lambda_2^2+\lambda_3^2}},$$

where the $\lambda$'s are eigenvalues of the tensors. Note that this anisotropy measure is computed for each pixel within a region. An additional term is then defined to impose a given distribution of the anisotropy inside each region. Let $p_{\alpha,1}$ and $p_{\alpha,2}$ be the probability distribution functions of the anisotropy inside and outside the region bounded by the curve C, approximated by Gaussian densities defined as $$p_{a,i} = \frac{1}{\sqrt{2\pi\sigma_{i,A}^2}} \exp\left(\frac{|A(T)-\overline{A}|^2}{2\sigma_{i,A}^2}\right),$$

where $\overline{A}$ is the mean value of A(T) over the region i, and $\sigma_{i,A}$ is the variance of $p_{i,A}$ over the region i. Then, the partitioning is obtained by minimizing:

$$-\int_\Omega \log p_{\alpha,1}(A(T(x)))H_\epsilon(\phi) + \log p_{\alpha,2}(A(T(x)))(1-H_\epsilon(\phi))dx,$$

where $\Omega \in R^3$ is the image domain, and $H_\epsilon$ is the Heaviside step function. This term is added to the objective function defined in equation (2), above. A new energy functional can be obtained for the level set function φ composed of three terms where the influence from the distribution of tensor distance and the fractional anisotropy can be controlled by adjusting a weight β between zero and one:

$$\int_\Omega [-(1-\beta)\log p_{d,1}(d^2(T(x),T_1))H_\varepsilon(\phi) - \qquad (3)$$
$$(1-\beta)\log p_{d,2}(d^2(T(x),T_2))(1-H_\varepsilon(\phi)) -$$
$$\beta \log p_{a,1}(A(T(x)))H_\varepsilon(\phi) -$$
$$\beta \log p_{a,2}(A(T(x)))(1-H_\varepsilon(\phi)) + \alpha|\nabla H_\varepsilon(\phi)|]dx$$

In practice, a small weight on the anisotropy term is sufficient for the surface avoid a local minima.

According to an embodiment of the invention, equation (3) can be efficiently solved by a fast level-set method. A level set formulation represents a front as the zero level set of a function defined in a higher dimensional space. Consider a closed moving interface Γ(t) in $R^3$. Let Ω(t) be the region (possibly multi-connected) that Γ(t) encloses. One can associate with Ω(t) an auxiliary function φ(x,t), called the level set function, which satisfies:

$$\begin{cases} \phi(x,t) > 0 & \text{for } x \in \Omega \\ \phi(x,t) = 0 & \text{for } x \in \partial\Omega \\ \phi(x,t) < 0 & \text{for } x \in \Omega^c \end{cases}$$

where $x \in R^3, t \in R^+$.

Conversely, knowing φ allows one to locate the interface by finding the zero level set of φ, which is Γ(t)={x:φ(x,t)=0}. So moving the interface is equivalent to updating φ, which can be done by solving a Hamilton-Jacobi equation, such as the time evolution equation for φ derived above.

But for some cases, one does not need the value of φ, only its sign. From the optimization point of view, this opens the possibility of other methods for solving a minimization problem directly and much more quickly. For instance, for a 2-phase image segmentation, one seeks a particular partition of a given image into two regions, one representing the objects to be detected and one representing the background. Assuming that the image $u_0$ is a 2-phase image with piecewise constant values $u_0^i$ and $u_0^o$ and that the object to be detected is represented by the value $u_0^i$, and that $C_0$ denotes the boundary of the object, then the fitting energy is defined as:

$$E_1(C)+E_2(C)=\int_{inside(C)}|u_0-c_1|^2+\int_{outside(C)}|u_0-c_2|^2,$$

where C is any other variable curve, and the constants $c_1$, $c_2$ are the averages of $u_0$ inside and outside of C respectively. The fitting energy will be minimized if $C=C_0$. In this model according to an embodiment of the invention, there can also be a regularizing term, such as the length of C, or the area inside C, to control the smoothness of the boundary. Therefore, the energy $E(C, c_1, c_2)$ is defined by:

$$E(C,c_1,c_2)=\alpha \cdot (\text{length}(C))+\lambda_1\int_{inside(C)}|u_0-c_1|^2+\lambda_2\int_{outside(C)}|u_0-c_2|^2.$$

If a level set represents C, that is, C is the zero level set of a Lipschitz function $\phi: R^2 \to R$, then φ can replace the unknown variable C, and the energy functional $E(C, c_1, c_2)$ can be written as:

$$E(H(\phi),c_1,c_2)=\alpha(\int_\Omega|\nabla H(\phi)|)+\lambda_1\int_\Omega|u_0-c_1|^2 H(\phi)dx + \lambda_2\int_\Omega|u_0-c_2|^2(1-H(\phi))dx,$$

where $c_1$, $c_2$ are also functions of H(φ). In this equation, the two fitting terms are easy to compute directly, while $\int|\nabla H(\phi)|dx$ can be approximated by:

$$\sum_{i,j}\sqrt{(H(\phi_{i+1,j})-H(\phi_{i,j}))^2+(H(\phi_{i,j+1})-H(\phi_{i,j}))^2},$$

where $\phi_{i,j}$ is the value of φ at the $i,j^{th}$ pixel. The summand can only take the values 0, 1 or $\sqrt{2}$, depending on whether the 3 distinct pair of points from the set $\{\phi_{i,j}, \phi_{i+1,j}, \phi_{i,j+1}\}$ belong to the same or different regions. Thus, the length term can be easily computed knowing only H(φ), and there is no need to know φ. This computed value can be interpreted as the discretized length of the zero level set.

Consider a two phase image, where one can represent an object by A (possibly multiconnected), the background by B, and the corresponding values for A and B by a and b. An initial partition is given by $\phi_1>0$ and $\phi_2<0$, where there are m points in $\phi_1$ and n points in $\phi_2$, and $c_i$ is the average for $\phi_i$, i=1, 2. Then, if $|c_1-c_2|>c$ for some constant c, and if the condition $$\frac{n-1}{n}\frac{m}{m+1} \leq \frac{(a-c_2)^2}{(a-c_1)^2} \leq \frac{m}{m-1}\frac{n+1}{n}$$

is not satisfied, then an algorithm (with α=0) according to an embodiment of the invention can be shown to converge in one sweep for a 2-phase image, using either Jacobi or Gauss-Seidel iterations. In practice, when applying the algorithm, one can directly apply the algorithm to the model with the length term included, or one can first consider α=0, then followed by α>0 to have the full effect of regularization. Another choice is to consider α=0, followed by a PDE-based algorithm.

An outline of a fast algorithm for solving the above model for scalar valued image is as follows:

Step 1. Initialize: given an initial partition of the image, set φ=1 for one part and φ=−1 for another part, and compute the value of the energy E according to φ.

Step 2. Advance: assume that the value of current pixel x is u, $c_1$ and $c_2$ are the pixel value averages for φ=1 and φ=−1, respectively, m and n are the number of pixels for φ=1 and φ=−1. If φ(x)=1, then compute the difference between the new and the old energy:

$$\Delta E_{12} = |u - c_2|^2 \frac{n}{n+1} - |u - c_1|^2 \frac{m}{m-1}.$$

If $\Delta E_{12} < 0$, then change $\phi(x)$ from 1 to $-1$. Similarly, if $\phi(x) = -1$ case, compute $\Delta E_{21}$:

$$\Delta E_{21} = |u - c_1|^2 \frac{m}{m+1} - |u - c_2|^2 \frac{n}{n-1},$$

and if $\Delta E_{21} < 0$, change $\phi(x)$ from $-1$ to 1. If there is no change in $\Delta E$, $\phi(x)$ remains unchanged. In 2D, if the length term is also considered, then the change of the length is easy to compute since only four neighbor points will be affected by a change of point value. The pixels can be looped through in any prescribed order, and can be updated using any iteration technique as is known in the art, such as Gauss-Seidel or Jacobi iteration.

Step 3. Repeat step 2 until the change in energy E is sufficiently small or zero.

Now, when applying the above fast level-set method to equation (3), some care is needed to handle the tensors and variance. Note that there are three terms in equation (3).

The first term in equation (3) represents the contribution of the tensor distance distribution where the tensor distance is computed between the tensor field and the segmentation mean values $T_1$ and $T_2$. If $\phi(x) = 1$, then the difference between the new and the old energy caused by this term is computed as:

$$\Delta E_{12,d} = (1 - \beta) \left( \frac{d^2(T(x), T_2)}{2\sigma_{2,d}^2} \frac{n}{n+1} - \frac{d^2(T(x), T_1)}{2\sigma_{1,d}^2} \frac{m}{m-1} \right).$$

Similarly, if $\phi(x) = -1$ case, $\Delta E_{21,d}$ can be computed as:

$$\Delta E_{21,d} = (1 - \beta) \left( \frac{d^2(T(x), T_1)}{2\sigma_{1,d}^2} \frac{m}{m+1} - \frac{d^2(T(x), T_2)}{2\sigma_{2,d}^2} \frac{n}{n-1} \right).$$

The second term in equation (3) represents the contribution of the fractional anisotropy distribution. If $\phi(x) = 1$, then the difference between the new and the old energy caused by this term is computed as:

$$\Delta E_{12,A} = \beta \left( \frac{|A(T(x)) - \overline{A}_2|^2}{2\sigma_{2,A}^2} \frac{n}{n+1} - \frac{|A(T(x)) - \overline{A}_1|^2}{2\sigma_{1,A}^2} \frac{m}{m-1} \right).$$

Similarly, if $\phi(x) = -1$ case, the change $\Delta E_{21,A}$ is computed as:

$$\Delta E_{21,A} = \beta \left( \frac{|A(T(x)) - \overline{A}_1|^2}{2\sigma_{1,A}^2} \frac{m}{m+1} - \frac{|A(T(x)) - \overline{A}_2|^2}{2\sigma_{2,A}^2} \frac{n}{n-1} \right).$$

The third term represents the smoothness of the boundary. In 2D, suppose the location of the point being changed is $x = (x_1, x_2)$, then the change in the energy caused by this term using a calculation using forward difference in $\phi$ is:

$$\Delta E_{ij,r} = \alpha (\sqrt{(\phi(x_1+1,x_2)-\phi_j)^2 + (\phi(x_1,x_2+1)-\phi_j)^2} - \sqrt{(\phi(x_1+1,x_2)-\phi_i)^2 + (\phi(x_1,x_2+1)-\phi_i)^2})$$

where $\phi_i$ is the level set value for region i, $\phi_j$ is the level set value for region j, either $\phi_i = 1$ and $\phi_j = -1$ or $\phi_i = -1$ and $\phi_j = 1$. The case for 3D is similar: suppose the location point being changed is $x = (x_1, x_2, x_3)$, then $$\Delta E_{ij,r} = \alpha \left( \sqrt{\begin{array}{c}(\phi(x_1+1,x_2,x_3)-\phi_j)^2 + \\ (\phi(x_1,x_2+1,x_3)-\phi_j)^2 + (\phi(x_1,x_2,x_3+1)-\phi_j)^2\end{array}} - \sqrt{\begin{array}{c}(\phi(x_1+1,x_2,x_3)-\phi_i)^2 + (\phi(x_1,x_2+1,x_3)-\phi_i)^2 + \\ (\phi(x_1,x_2,x_3+1)-\phi_i)^2\end{array}} \right)$$

and the above calculation can also based on central difference in $\phi$.

The total change of the energy function obtained by combining all the three terms decides how to change the sign of $\phi(x)$: that is, if $\Delta E_{Tot} < 0$, the total energy decreases, then the region membership of the point in question is changed.

Figure 7:
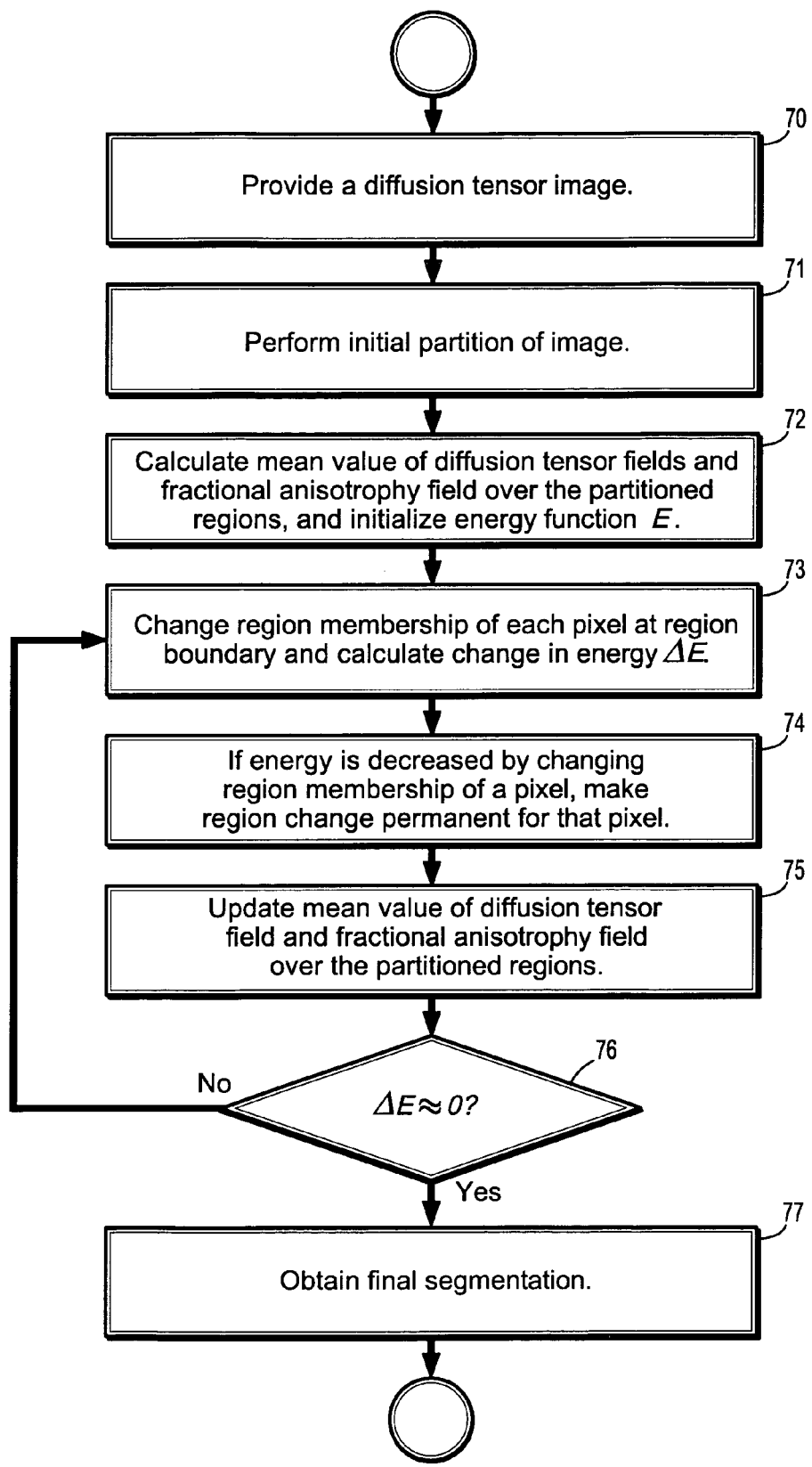
FIG. 7 is a flow chart of an exemplary method for tensor field segmentation, according to an embodiment of the invention.

A flow chart of an exemplary method for tensor field segmentation, according to an embodiment of the invention, is presented in FIG. 7. At step 70, a diffusion tensor image acquires through DT-MRI is provided. In DT-MRI, what is measured is the diffusion weighted echo intensity image (DWI) $S_l$ for different directions l. These directions are related to the diffusion tensor T through the following equation:

$$S_l = S_0 \exp(-b_l{:}T) = S_0 \exp(-\Sigma_{i=1}^3 \Sigma_{j=1}^3 b_{l,ij} T_{ij}),$$

where $b_l$ is the diffusion weighting of the l-th magnetic gradient, and ":" denotes the generalized inner product for matrices. Given several non-collinear diffusion weighted intensity measurements, T can be estimated via multivariate regression techniques and a diffusion tensor image is constructed. At step 71, an initial partition of the image into separate regions is provided. According to one embodiment of the invention, the image is partitioned into two regions, with the auxiliary function $\phi$ being set to 1 inside an initial partition curve, and being set to $-1$ outside the curve. At step 72, the mean value of the tensor fields and the mean value of the fractional anisotropy field are then calculated over the two regions, and an initial value of the energy is calculated, using the energy functional defined above. At step 73, the iteration is advanced by looping through all pixels. For each pixel at location x near the region boundary, if $\phi(x) = 1$, then change it so $\phi(x) = -1$, and vice versa if $\phi(x) = -1$, and then compute the change in energy. In general, the change in the tensor distribution energy $\Delta E_{ij,d}$ from changing the membership of a pixel from region i to region j is $$\Delta E_{ij,d} = (1 - \beta) \left( \frac{d^2(T(x), T_j)}{2\sigma_{j,d}^2} \frac{n_j}{n_j+1} - \frac{d^2(T(x), T_i)}{2\sigma_{i,d}^2} \frac{n_i}{n_i-1} \right).$$

and the corresponding change in the factional anisotropy distribution energy $\Delta E_{ij,A}$ is $$\Delta E_{ij,A} = \beta \left( \frac{|A(T(x)) - \overline{A}_j|^2}{2\sigma_{j,A}^2} \frac{n_j}{n_j+1} - \frac{|A(T(x)) - \overline{A}_i|^2}{2\sigma_{i,A}^2} \frac{n_i}{n_i-1} \right)$$

where $n_i$ and $n_j$ are the respective number of pixels for each region. In this exemplary method which achieves a piecewise constant segmentation, all the variances can be set to 1 and the energy change can be computed accordingly. If the total energy change, which includes the above two energy changes and the changes in boundary smoothness, is decreased by changing the region membership of a pixel, then the region membership of the pixel should be changed at step 74. At step 75, the mean value of the tensor fields and the mean value of the fractional anisotropy field are updated when the region changes. At step 76, if the magnitude of the change in energy is greater than a predetermined value, the process returns to step 73 to perform another iteration. An appropriate threshold can be determined experiment by one of ordinary skill in the art. Once the iterations fail to produce a change in energy, the resulting segmentation is obtained at step 77, and the process is finished.

Figure 2:
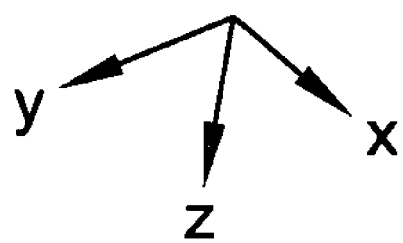
Figure 2:
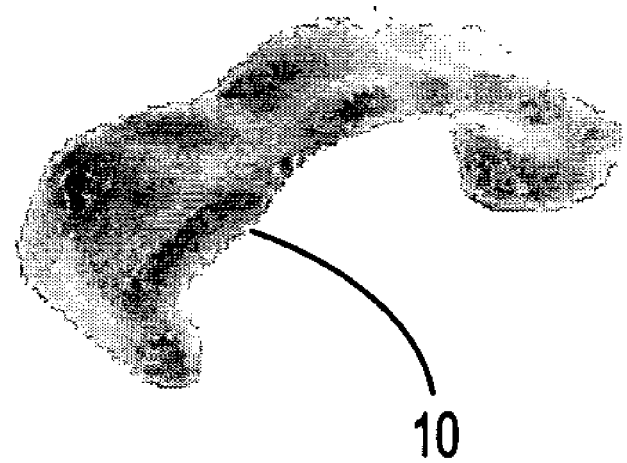
Figure 3:
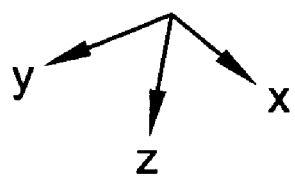
FIGS. 3 and 4 depict an exemplary segmentation of the Corona Radiata, with and without an FA slice, respectively, according to an embodiment of the invention.
Figure 3:
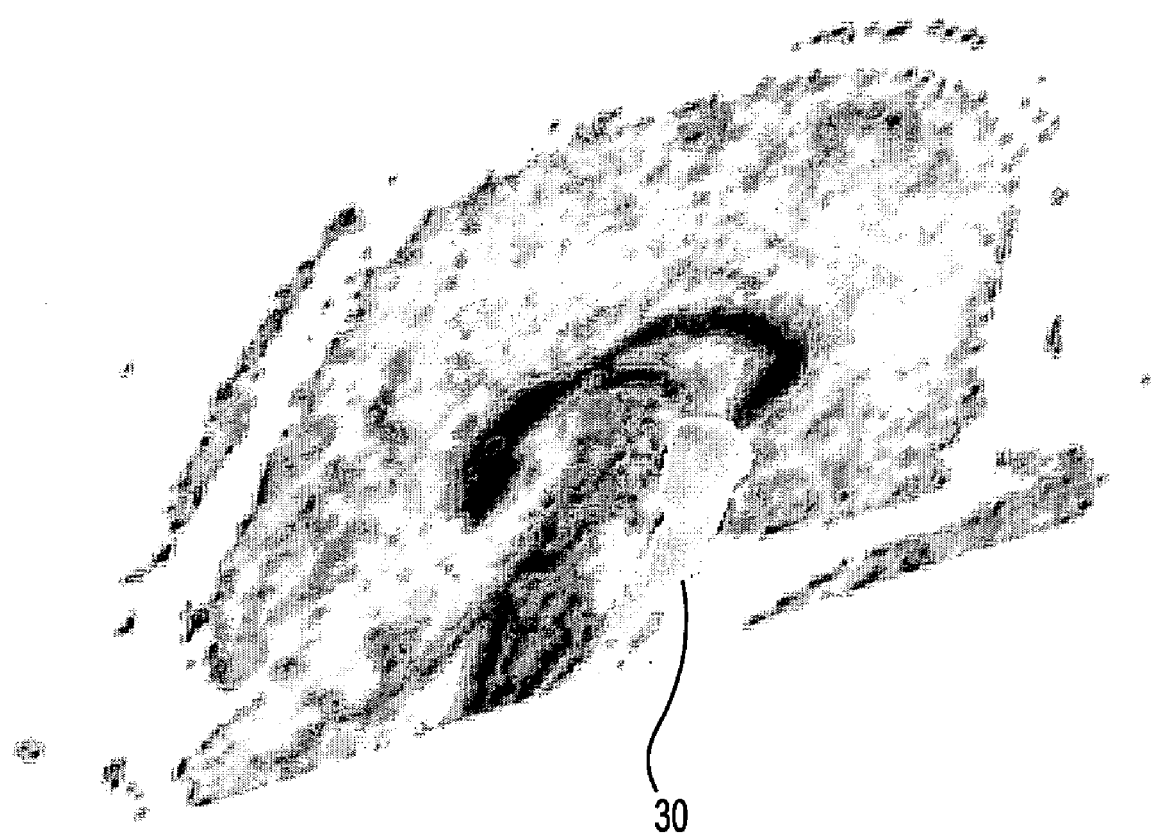
Figure 4:
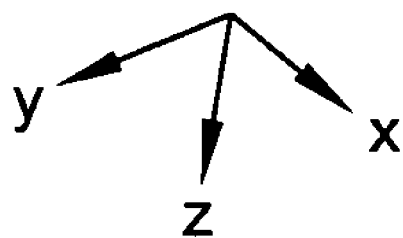
Figure 4:
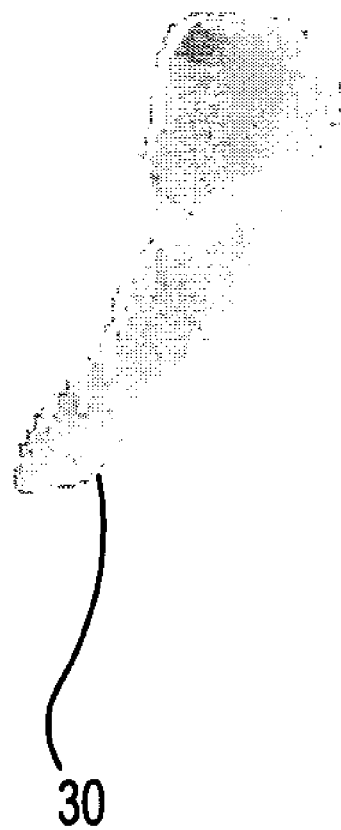
Figure 5:
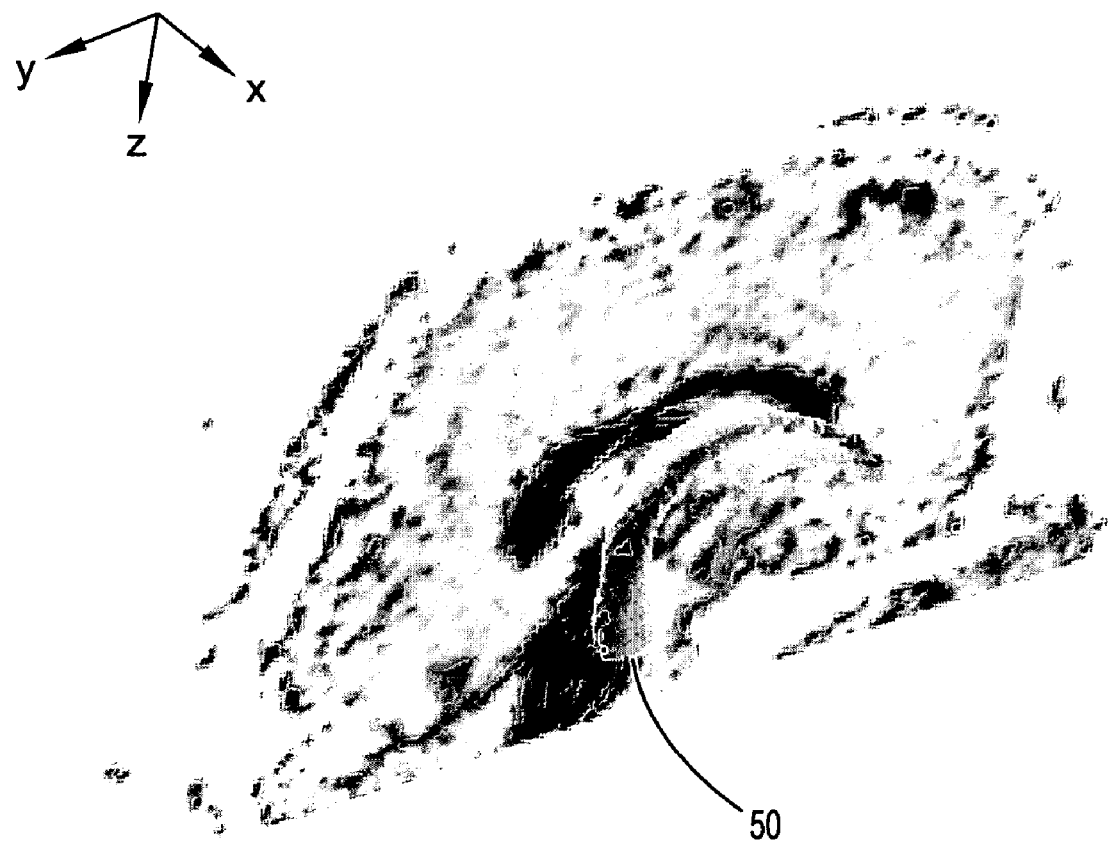
FIGS. 5 and 6 depict an exemplary segmentation of the ventricle, with and without an FA slice, respectively, according to an embodiment of the invention.
Figure 6:
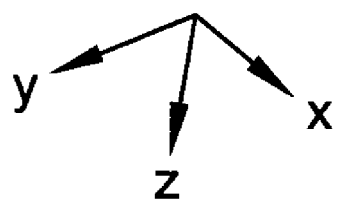
Figure 6:
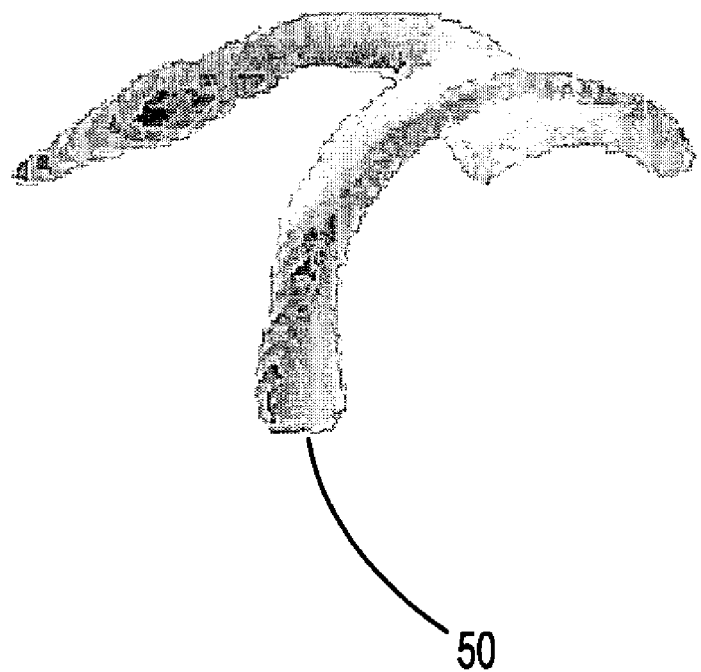

An implementation of an embodiment of the invention not incorporating variance has been tested on a DELL precision 670 workstation with a Xeon™ 2.8 Ghz CPU with 2.0 GB of RAM, and running under the Microsoft Windows XP Professional Version 2002, Service Pack 2 operating system. Segmentation results of three brain structures are presented in FIGS. 1-6, according to an embodiment of the invention. Each segmentation is presented in two figures, one being paired with an FA slice as a context, the other being simply the segmentation itself. FIGS. 1 and 2 depict segmentation of the Corpus Callosum 10, FIGS. 3 and 4 depict segmentation of the Corona Radiata 30, and FIGS. 5 and 6 depict segmentation of the ventricle 50. All the above three segmentation were achieved within 5 seconds.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 8:
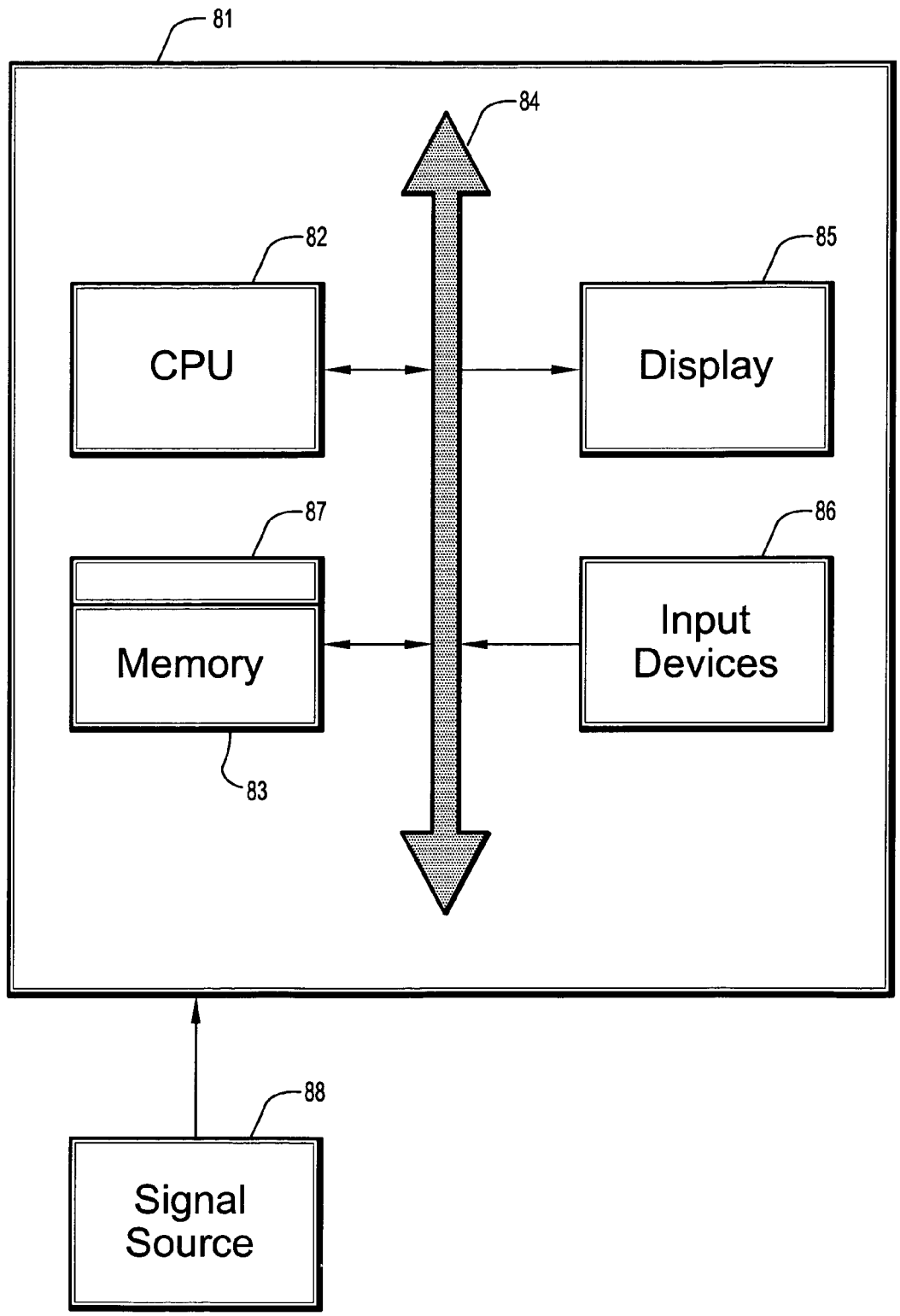
FIG. 8 is a block diagram of an exemplary computer system for implementing a tensor field segmentation algorithm according to an embodiment of the invention.

FIG. 8 is a block diagram of an exemplary computer system for implementing a level-set based tensor field segmentation according to an embodiment of the invention. Referring now to FIG. 8, a computer system 81 for implementing the present invention can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present invention can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present invention.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method of segmenting a digitized medical image, the method performed by the computer comprising the steps of:

providing a digitized image of an anatomical region, said image comprising a diffusion tensor field corresponding to a domain of points on a 3-dimensional grid;

partitioning said image into 2 regions, wherein each point is initially assigned to one of said regions;

initializing an energy defined as a functional of said diffusion tensor field, wherein said energy functional includes the terms $(1-\beta)\int_\Omega (\log p_{d,1}(d^2(T(x),T_1))H_\epsilon(\phi) + \log p_{d,2}(d^2(T(x),T_2))(1-H_\epsilon(\phi)))dx$ wherein $\phi:\Omega \rightarrow R^3$ denotes the level set function defined on the image domain $\Omega$ whose zero isosurface coincides with a curve enclosing one of said 2 regions, $T_1$ and $T_2$ are mean values of the tensor field in each of the two regions, $H_\epsilon(\phi)$ is the regularized version of the Heaviside function of the level set function, $p_{d,1}$ and $p_{d,2}$ are probability distribution functions of the tensor distance in each of the two regions, $\beta$ is a weighting parameter, and $d^2(.,.)$ is a tensor distance;

changing the region membership of each point in said image if the energy functional value decreases as a result of said region membership change and updating said mean value of said diffusion tensor field over each of said 2 regions; and obtaining a segmentation of said image when the magnitude of the change of said energy function value resulting from changing the region membership of a point is less then a predetermined threshold.

2. The method of claim 1, wherein said tensor distance between tensors $T_1$ and $T_2$ is defined by $$d(T_1, T_2) = \frac{1}{2}\sqrt{tr(T_1^{-1}T_2 + T_2^{-1}T_1) - 2n}$$

wherein tr(•) is the matrix trace operator, and n is the size of the square matrices $T_1$ and $T_2$.

3. The method of claim 1, wherein said mean value $\overline{M}$ of a diffusion tensor field $T(x)$ in a region R is defined by $\overline{M} = \sqrt{B^{-1}}[\sqrt{\sqrt{B}A\sqrt{B}}]\sqrt{B^{-1}}$, wherein $A = \int_R T(x)dx$, and $B = \int_R T^{-1}(x)dx$, and R is the region of integration.

4. The method of claim 1, wherein said level-set function has a value of −1 in one region and a value of +1 in the other region.

5. The method of claim 2, wherein said probability distribution of the distance from said diffusion tensor field to a mean value of said field is defined as $$p_{d,i} = \frac{1}{\sqrt{2\pi\sigma_{i,d}^2}} \exp\left(\frac{-d^2(T(x), T_i)}{2\sigma_{i,d}^2}\right)$$

where $T_i$ is the mean value of said tensor field in one of said 2 regions, $T(x)$ is said tensor field, $\sigma_{i,d}$ is the variance of said distribution in one of said 2 regions.

6. The method of claim 1, further comprising calculating a fractional anisotropy defined by $$A(T(x)) = \frac{\sqrt{(\lambda_1 - \lambda_2)^2 + (\lambda_2 - \lambda_3)^2 + (\lambda_1 - \lambda_3)^2}}{\sqrt{2}\sqrt{\lambda_1^2 + \lambda_2^2 + \lambda_3^2}},$$

wherein the $\lambda_1, \lambda_2, \lambda_3$ are eigenvalues of the diffusion tensor field, and calculating a mean and variance of said fractional anisotropy over each of said 2 regions.

7. The method of claim 6, further comprising updating the mean value and variance of said fractional anisotropy of the diffusion tensor in each of said 2 regions if the energy functional value decreases as a result of said region membership change.

8. The method of claim 6, wherein said energy function further includes terms $-\beta \int_\Omega (\log p_{\alpha,1}(A(T(x))H_\epsilon(\phi) + \log p_{\alpha,2}(A(T(x)))(1-H_\epsilon(\phi)))dx,$ wherein $\phi:\Omega \to R^3$ denotes the level set function defined on the image domain $\Omega$ whose zero isosurface coincides with a curve enclosing one of said 2 regions, $H_\epsilon(\phi)$ is the regularized version of the Heaviside function of the level set function, $p_{\alpha,1}$ and $p_{\alpha,2}$ are probability distribution functions of the fractional anisotropy in each of the two regions, and $\beta$ is a weighting parameter.

9. The method of claim 8, wherein said probability distribution function of said fractional anisotropy is defined as $$p_{\alpha,i} = \frac{1}{\sqrt{2\pi\sigma_{i,A}^2}} \exp\left(\frac{|A(T) - \overline{A}_i|^2}{2\sigma_{i,A}^2}\right),$$

wherein $\overline{A}$ is the mean value of $A(T)$ over the region i, and $\sigma_{i,A}$ is the variance of $p_{\alpha,i}$ over the region i.

10. The method of claim 1, further comprising calculating variances of the distance of said diffusion tensor to the mean value over each of said two regions, and updating said variances when the energy functional value decreases as a result of said region membership change.

11. The method of claim 1, wherein a change in energy $\Delta E_{ij}$ from changing the membership of a point from region i to region j includes $$\Delta E_{ij,d} = (1-\beta)\left(\frac{d^2(T(x), T_j)}{2\sigma_{j,d}^2} \frac{n_j}{n_j+1} - \frac{d^2(T(x), T_i)}{2\sigma_{i,d}^2} \frac{n_i}{n_i-1}\right).$$

wherein the value of the point being changed is $T(x)$, $T_1$ and $T_2$ are the mean values of the tensor field in each region, respectively, and $n_i$ and $n_j$ are the respective number of points for each region.

12. The method of claim 8, wherein a change in energy $\Delta E_{ij}$ from changing the membership of a point from region i to region j includes $$\Delta E_{ij,A} = \beta\left(\frac{|A(T(x)) - \overline{A}_j|^2}{2\sigma_{j,A}^2} \frac{n_j}{n_j+1} - \frac{|A(T(x)) - \overline{A}_i|^2}{2\sigma_{i,A}^2} \frac{n_i}{n_i-1}\right)$$

wherein $\overline{A}_i$ is the mean value of $A(T)$ over the region i, $\sigma_{i,A}$ is the variance of $p_{\alpha,i}$ over the region i, and $n_i$, and $n_j$ are the respective number of points for each region.

13. A computer implemented method of segmenting a digitized medical image, the method performed by the computer comprising the steps of:

providing a digitized image of an anatomical region, said image comprising a diffusion tensor field $T(x)$ corresponding to a domain of points on a n-dimensional grid;

partitioning said image into 2 regions, wherein each point is initially assigned to one of said regions;

calculating a mean value of said diffusion tensor field over each of said 2 regions;

calculating an energy change that would result from changing the region membership of each point in said image, wherein said change in energy $\Delta E_{ij}$ from changing the membership of a point from region i to region j includes the term $$\Delta E_{ij,d} = (1-\beta)\left(\frac{d^2(T(x), T_j)}{2\sigma_{j,d}^2} \frac{n_j}{n_j+1} - \frac{d^2(T(x), T_i)}{2\sigma_{i,d}^2} \frac{n_i}{n_i-1}\right).$$

wherein the value of the point being changed is $T(x)$, $T_i$ and $T_j$ are the mean values of the tensor field in each region, respectively, $n_i$ and $n_j$ are the respective number of points for each region, $\sigma_{i,d}$ and $\sigma_{j,d}$ are the variances of said mean values in each of said 2 regions, $d((,))$ is a distance function, and $\beta$ is a weighting factor whose value is between 0 and 1;

changing the region membership of a point if said energy change is negative; and obtaining a segmentation of said image when the magnitude of the energy change from changing the region membership of each point is less than a predetermined threshold.

14. The method of claim 13, further comprising associating an level-set function with each region, wherein said level-set function has a negative value in one region and a positive value in the other region.

15. The method of claim 14, further comprising initializing an energy defined as a functional of said level set functions and said diffusion tensor field, wherein said energy functional includes the terms $(1-\beta)\int_\Omega(\log p_{d,1}(d^2(T(x),T_1))H_\epsilon(\phi) + \log p_{d,2}(d^2(T(x), T_2)))(1-H_\epsilon(\phi)))dx$ wherein $\phi:\Omega \to R^3$ denotes the level set function defined on the image domain $\Omega$ whose zero isosurface coincides with a curve enclosing one of said 2 regions, $H_\epsilon(z)$ is the regularized version of the Heaviside function of the level set function, and $p_{d,1}$ and $p_{d,2}$ are probability distribution functions of the tensor distance in each of the two regions.

16. A program storage device readable by a computer, tangibly embodying a program of instructions executable by the computer to perform the method steps for segmenting a digitized medical image, said method comprising the steps of:

providing a digitized image of an anatomical region, said image comprising a diffusion tensor field corresponding to a domain of points on a 3-dimensional grid;

partitioning said image into 2 regions, wherein each point is initially assigned to one of said regions;

initializing an energy defined as a functional of said diffusion tensor field, wherein said energy functional includes the terms $(1-\beta)\int_\Omega(\log p_{d,1}(d^2(T(x),T_1))H_\epsilon(\phi)+\log p_{d,2}(d^2(T(x),T_2))(1-H_\epsilon(\phi)))dx$ wherein $\phi:\Omega \to R^3$ denotes the level set function defined on the image domain $\Omega$ whose zero isosurface coincides with a curve enclosing one of said 2 regions, $T_1$ and $T_2$ are mean values of the tensor field in each of the two regions, $H_\epsilon(\phi)$ is the regularized version of the Heaviside function of the level set function, $p_{d,1}$ and $p_{d,2}$ are probability distribution functions of the tensor distance in each of the two regions, $\beta$ is a weighting parameter, and $d^2(.,.)$ is a tensor distance;

changing the region membership of each point in said image if the energy functional value decreases as a result of said region membership change and updating said mean value of said diffusion tensor field over each of said 2 regions; and obtaining a segmentation of said image when the magnitude of the change of said energy function value resulting from changing the region membership of a point is less then a predetermined threshold.

17. The computer readable program storage device of claim 16, wherein said tensor distance between tensors $T_1$ and $T_2$ is defined by $$d(T_1, T_2) = \frac{1}{2}\sqrt{tr(T_1^{-1}T_2 + T_2^{-1}T_1) - 2n}$$

wherein $tr(\bullet)$ is the matrix trace operator, and n is the size of the square matrices $T_1$ and $T_2$.

18. The computer readable program storage device of claim 16, wherein said mean value $\overline{M}$ of a diffusion tensor field $T(x)$ in a region R is defined by $\overline{M}=\sqrt{B^{-1}}[\sqrt{\sqrt{B}A\sqrt{B}}]\sqrt{B^{-1}}$, wherein $A=\int_R T(x)dx$, and $B=\int_R T^{-1}(x)dx$, and R is the region of integration.

19. The computer readable program storage device of claim 16, wherein said level-set function has a value of −1 in one region and a value of +1 in the other region.

20. The computer readable program storage device of claim 17, wherein said probability distribution of the distance from said diffusion tensor field to a mean value of said field is defined as $$p_{d,i} = \frac{1}{\sqrt{2\pi\sigma_{i,d}^2}}\exp\left(\frac{-d^2(T(x),T_i)}{2\sigma_{i,d}^2}\right)$$

where $T_i$ is the mean value of said tensor field in one of said 2 regions, $T(x)$ is said tensor field, $\sigma_{i,d}$ is the variance of said distribution in one of said 2 regions.

21. The computer readable program storage. device of claim 16, the method further comprising calculating a fractional anisotropy defined by $$A(T(x)) = \frac{\sqrt{(\lambda_1-\lambda_2)^2 + (\lambda_2-\lambda_3)^2 + (\lambda_1-\lambda_3)^2}}{\sqrt{2}\sqrt{\lambda_1^2+\lambda_2^2+\lambda_3^2}},$$

wherein the $\lambda_1, \lambda_2, \lambda_3$ are eigenvalues of the diffusion tensor field, and calculating a mean and variance of said fractional anisotropy over each of said 2 regions.

22. The computer readable program storage device of claim 21, the method further comprising updating the mean value and variance of said fractional anisotropy of the diffusion tensor in each of said 2 regions if the energy functional value decreases as a result of said region membership change.

23. The computer readable program storage device of claim 21, wherein said energy function further includes terms $-\beta\int_\Omega(\log p_{\alpha,1}(A(T(x)))H_\epsilon(\phi)+\log p_{\alpha,2}(A(T(x)))(1=H_\epsilon(\phi)))dx,$ wherein $\phi:\Omega \to R^3$ denotes the level set function defined on the image domain $\Omega$ whose zero isosurface coincides with a curve enclosing one of said 2 regions, $H_\epsilon(\phi)$ is the regularized version of the Heaviside function of the level set function, $p_{\alpha,1}$ and $p_{\alpha,2}$ are probability distribution functions of the fractional anisotropy in each of the two regions, and $\beta$ is a weighting parameter.

24. The computer readable program storage device of claim 23, wherein said probability distribution function of said fractional anisotropy is defined as $$p_{a,i} = \frac{1}{\sqrt{2\pi\sigma_{i,A}^2}}\exp\left(\frac{|A(T)-\overline{A}|^2}{2\sigma_{i,A}^2}\right),$$

wherein $\overline{A}$ is the mean value of A(T) over the region i, and $\sigma_{i,A}$ is the variance of $p_{a,i}$ over the region i.

25. The computer readable program storage device of claim 16, the method further comprising calculating variances of the distance of said diffusion tensor to the mean value over each of said two regions, and updating said variances when the energy functional value decreases as a result of said region membership change.

26. The computer readable program storage device of claim 16, wherein a change in energy $\Delta E_{ij}$ from changing the membership of a point from region i to region j includes $$\Delta E_{ij,d} = (1-\beta)\left(\frac{d^2(T(x), T_j)}{2\sigma_{j,d}^2} \frac{n_j}{n_j+1} - \frac{d^2(T(x), T_i)}{2\sigma_{i,d}^2} \frac{n_i}{n_i-1}\right)$$

wherein the value of the point being changed is T(x), $T_1$ and $T_2$ are the mean values of the tensor field in each region, respectively, and $n_i$ and $n_j$ are the respective number of points for each region.

27. The computer readable program storage device of claim 23, wherein a change in energy $\Delta E_{ij}$ from changing the membership of a point from region i to region j includes $$\Delta E_{ij,A} = \beta\left(\frac{|A(T(x))-\overline{A}_j|^2}{2\sigma_{j,A}^2} \frac{n_j}{n_j+1} - \frac{|A(T(x))-\overline{A}_i|^2}{2\sigma_{i,A}^2} \frac{n_i}{n_i-1}\right)$$

wherein $\overline{A}$ is the mean value of A(T) over the region i, $\sigma_{i,A}$ is the variance of $p_{a,i}$ over the region i, and $n_i$ and $n_j$ are the respective number of points for each region.

* * * * *